United States Patent
Liu

(10) Patent No.: US 9,360,549 B1
(45) Date of Patent: Jun. 7, 2016

(54) METHODS AND APPARATUS FOR A SELF-CALIBRATED SIGNAL INJECTION SETUP FOR IN-FIELD RECEIVE PHASED ARRAY CALIBRATION SYSTEM

(71) Applicant: Thales-Raytheon Systems Company LLC, Fullerton, CA (US)

(72) Inventor: Sien-Chang C. Liu, Brea, CA (US)

(73) Assignee: Thales-Raytheon Systems Company LLC, Fullerton, CA (US)

( * ) Notice: Subject to any disclaimer, the term of this patent is extended or adjusted under 35 U.S.C. 154(b) by 74 days.

(21) Appl. No.: 14/296,684

(22) Filed: Jun. 5, 2014

(51) Int. Cl.
G01S 7/40 (2006.01)
H01Q 3/26 (2006.01)
G01S 7/00 (2006.01)
G01S 13/00 (2006.01)
G01S 13/02 (2006.01)

(52) U.S. Cl.
CPC ...... G01S 7/40 (2013.01); H01Q 3/267 (2013.01); G01S 2013/0245 (2013.01)

(58) Field of Classification Search
CPC .......... G01S 7/02; G01S 7/40; G01S 7/4004; G01S 7/4008; G01S 7/4026; G01S 13/02; G01S 2013/0236; G01S 2013/0245; H01Q 3/26; H01Q 3/267; H04B 7/02; H04B 7/04; H04B 7/08; H04B 7/0837; H04B 7/084
USPC ............. 342/73–81, 165–175, 195, 368–377; 370/276, 277, 278
See application file for complete search history.

(56) References Cited

U.S. PATENT DOCUMENTS

| | | | |
|---|---|---|---|
| 5,081,460 A | 1/1992 | Liu | |
| 5,086,302 A * | 2/1992 | Miller | H01Q 3/267 342/173 |
| 5,248,982 A | 9/1993 | Reinhardt et al. | |
| 5,253,188 A | 10/1993 | Lee et al. | |
| 5,680,141 A * | 10/1997 | Didomenico | H01Q 3/267 342/372 |
| 5,867,123 A * | 2/1999 | Geyh | H01Q 3/267 342/173 |
| 6,084,545 A * | 7/2000 | Lier | H01Q 3/267 342/174 |
| 6,127,966 A * | 10/2000 | Erhage | H01Q 3/267 342/165 |
| 6,208,287 B1 * | 3/2001 | Sikina | H01Q 3/267 342/174 |
| 6,252,542 B1 * | 6/2001 | Sikina | H01Q 3/267 342/174 |
| 6,549,164 B2 * | 4/2003 | Paschen | H01Q 3/267 342/371 |
| 6,895,230 B1 * | 5/2005 | Blount | H04B 7/084 342/174 |
| 7,298,217 B2 | 11/2007 | Adlerstein et al. | |
| 8,102,785 B2 * | 1/2012 | Rao | H01Q 3/267 370/278 |

OTHER PUBLICATIONS

"Digital Beam Steering Antenna" by Louise Eber, Rome Air Development Center Technical Report RADC 88-83, Jun. 1988, NTIS No. A200030, 137 pages.

"Experimental Results of a Self Calibrating Digital Beamforming Array" by Jeffrey Herd, Antenna Technology Branch, Electromagnetic Sciences Directorate, Rome Air Development Center, Hanscom AFB, MA, IEEE AP Symposium 1990, 4 pages.

* cited by examiner

*Primary Examiner* — Bernarr Gregory
(74) *Attorney, Agent, or Firm* — Daly, Crowley, Mofford & Durkee, LLP

(57) ABSTRACT

Methods and apparatus provide calibration of a system using a cable check configuration and a calibration test configuration. A short to ground reflects an injected signal to characterize a first signal path in the cable check configuration. Switch setting can then be adjusted to inject a signal that is coupled to an array element and received from a feed. The signal paths can be characterized to enable in-field calibration testing.

20 Claims, 11 Drawing Sheets

METHODS AND APPARATUS FOR A SELF-CALIBRATED SIGNAL INJECTION SETUP FOR IN-FIELD RECEIVE PHASED ARRAY CALIBRATION SYSTEM

BACKGROUND

As is known in the art, phased array radar systems in general must be calibrated in order to operate effectively. Since a phased array radar typically uses many active and passive components to form its aperture vector (amplitude and phase) state, these must be aligned in order to form a high efficiency radiation beam. While various methods are available to provide the initial calibration state, to correct for variability (recalibration), and to identify failed components for replacement, calibration often can be verified by or controlled through either near field or far field sensing methods.

In one known technique, there is calibration of the individual components in the chain extending from the antenna beam port. After calibration in the factory, these components are assembled in the field to produce an initially calibrated aperture. However, this method of calibration has a number of drawbacks, including for example, reliance on a system to catalogue the calibrated components in the beam formation chain, such that mistakes have the potential to produce an uncalibrated system. In addition, in this method there is no means of verifying the calibrated state, such that whenever a vector state error is produced, which can be due to assembly error, natural component degradation, or error, it cannot be directly detected.

Phased array radar calibration in the field requires relatively long RF cables to complete a test loop for some conventional calibration techniques. Amplitude and phase variations of the long cable due to temperature fluctuation and cable movement over time can corrupt the amplitude and phase measurements and degrade the phased array radar calibration accuracy. During temperature cycling tests, the amplitude and phase errors of the long test cables can significantly corrupt phased array calibration data.

In some known phased array calibration techniques, the temperature around the test cables and test setup is controlled. Alternatively, expensive RF cables and components, which are insensitive to temperature or cable movement and bending, can be used. However, these methods do not meet accuracy requirements over large temperature variations. As temperatures rise or fall, the internal cable temperature tends to heat up or cool down more slowly than environmental temperature changes. This results in cable temperature change lagging the outside temperature change, which can cause significant cable phase uncertainty for the same environmental temperature. For a long cable, the time constant for cable temperature stabilization is quite long (minutes or even in hours) rendering accurate calibration in the field challenging.

SUMMARY

The present invention provides method and apparatus for system calibration, such as for a phased array radar, by utilizing multiple switches and signal path configurations to provide instantaneous test setup calibration before radar system calibration measurements, for example. By providing a short to ground, a measurement system, which can be formed by an exciter and a receiver for example, can measure two-way cable amplitude and phase of the test setup. This real-time measurement data of the calibration signal injection paths can be used to remove system calibration measurement errors due to test setup variation over time and/or temperature. After the completion of the test setup measurements, signal path connections can be switched to allow the array to be calibrated. For a deployed phased array radar system, the measurement system can be provided as a radar exciter and receiver to conduct real-time cable calibration.

Embodiments of the invention enable real-time test setup measurements right before the system calibration test, for example. An RF short at the cable end reflects test signals back to the phase and amplitude measurement system. Based on the results of the test cable and test setup RF characteristics, phase and/or amplitude variations due to temperature changes or cable movement can be calibrated out before the system calibration tests. Thus, test accuracy can be assured without strict temperature control or expensive special RF cables.

In-field phased array calibration is desirable on a periodic basis, as well as when a selected temperature gradient is detected since temperature and mechanical stress can alter the characteristics of cables and other components. The phase and amplitude characteristics of cables and test setup can be measured in real-time by the radar subsystems with RF switches and a short at the end of a cable. Since injection signal paths can be calibrated in real-time, the need to have a common loop path calibrator, equal cable lengths, or strict temperature control, is not required, in contrast to some known calibration techniques.

With a short at the end of the cable, the RF signal is reflected back with the same amplitude and a 180-degree phase change. The measured phase of the signal is the round trip propagation phase through the cable plus 180 degrees and the amplitude attenuation is about twice that of the cable loss. Based on the measurements, the true cable propagation phase and loss can be calculated and removed from the test cable setup for in-field phased array radar system calibration. Any cable phase and amplitude variations due to temperature and mechanical stress over time can be removed from the calibration data.

The injection signal path correction data are used to remove the path-to-path amplitude and phase variations of the calibration signal injection setup so that the calibration results can be corrected during the calibration test step. The corrected calibration data are then used to align the signal vectors from each path by adjusting the phase and amplitude of the phase shifter module or the Transmit/Receive (T/R) module of each individual element of the phased array during in-field system calibration. For phased array radar systems using digital beamforming, the corrected calibration data can be sent directly to the digital beamformer processing module in the signal processor to digitally correct the received signal waveform so that no phase shifter or T/R module adjustments are needed.

In one aspect of the invention, a method comprises: injecting a first signal through a first signal path including a first element, a first cable, a multiport switch, a second cable, and a feed switch; setting the feed switch to have a connection to ground prior to injecting the first signal; receiving the first signal reflected from ground through the feed switch, the second cable, the multiport switch, the first cable, the first element, and a receive switch for reception by a receiver; measuring characteristics of the first signal received by the receiver, characterizing the first signal path from the first signal that is received; modifying settings on the feed switch and the receive switch; injecting a second signal through the first element, the first cable, the multiport switch, the second cable, and the feed switch into a feed coupled to an array element via a coupler, receiving the second signal from the array element through a second signal path including the feed and the receiver switch; characterizing the second signal path based on the received second signal; subtracting at least some of the characteristics of the first path from calibration signals injected into the array element; and deriving phase and amplitude correction constants from the calibration signal measurements.

The method can further include one or more of the following features: sending information for the phase and amplitude correction constants to phase shifters and/or transmit/receive modules via a beam steering module, at least some of the characteristics comprise substantially half of the relative phase and loss of the calibration paths, the characteristics include phase and amplitude, the array elements form part of a phased array radar, calibration is independent of the length of the first and second cables, the first element comprises a circulator, the receiver performs digital beamforming, performing in-field calibration for a deployed phased array radar system, and/or performing calibration immediately after the step of deriving phase and amplitude correction constants from the calibration signal measurements.

In another aspect of the invention, an article comprises: a non-transitory storage medium containing stored instructions that enable a machine to: subtract at least some of the characteristics of a first path from calibration signals injected into an array element; and derive phase and amplitude correction constants from the calibration signal measurements, after: injecting a first signal through the first signal path including a first element, a first cable, a multiport switch, a second cable, and a feed switch; setting the feed switch to have a connection to ground prior to injecting the first signal; receiving the first signal reflected from ground through the feed switch, the second cable, the multiport switch, the first cable, the first element, and a receive switch for reception by a receiver, measuring characteristics of the first signal received by the receiver, characterizing the first signal path from the first signal that is received; modifying settings on the feed switch and the receive switch; injecting a second signal through the first element, the first cable, the multiport switch, the second cable, and the feed switch into a feed coupled to an array element via a coupler; receiving the second signal from the array element through a second signal path including the feed and the receiver switch; and characterizing the second signal path based on the received second signal.

The article can further include one or more of the following features: instructions for sending information for the phase and amplitude correction constants to phase shifters and/or transmit/receive modules via a beam steering module, at least some of the characteristics comprise substantially half of the relative phase and loss of the calibration paths, the characteristics include phase and amplitude, the array elements form part of a phased array radar, calibration is independent of the length of the first and second cables, the first element comprises a circulator, the receiver performs digital beamforming, and/or performing in-field calibration for a deployed phased array radar system.

In a further aspect of the invention, a radar system comprises: a calibration system including a multiport switch, an RF switch, and a feed switch; and a feed coupled to array elements; and a processor coupled to a memory, the processor and memory configured to: inject a first signal through a first signal path including a first element, a first cable, the multiport switch, a second cable, and the feed switch; set the feed switch to have a connection to ground prior to injecting the first signal; receive the first signal reflected from ground through the feed switch, the second cable, the multiport switch, the first cable, the first element, and a receive switch for reception by a receiver; measure characteristics of the first signal received by the receiver; characterize the first signal path from the first signal that is received; modify settings on the feed switch and the receive switch; inject a second signal through the first element, the first cable, the multiport switch, the second cable, and the feed switch into a feed coupled to an array element via a coupler; receive the second signal from the array element through a second signal path including the feed and the receiver switch; characterize the second signal path based on the received second signal; subtract at least some of the characteristics of the first path from calibration signals injected into the array element; and derive phase and amplitude correction constants from the calibration signal measurements.

BRIEF DESCRIPTION OF THE DRAWINGS

The foregoing features of this invention, as well as the invention itself, may be more fully understood from the following description of the drawings in which.

DETAILED DESCRIPTION

Figure 1:
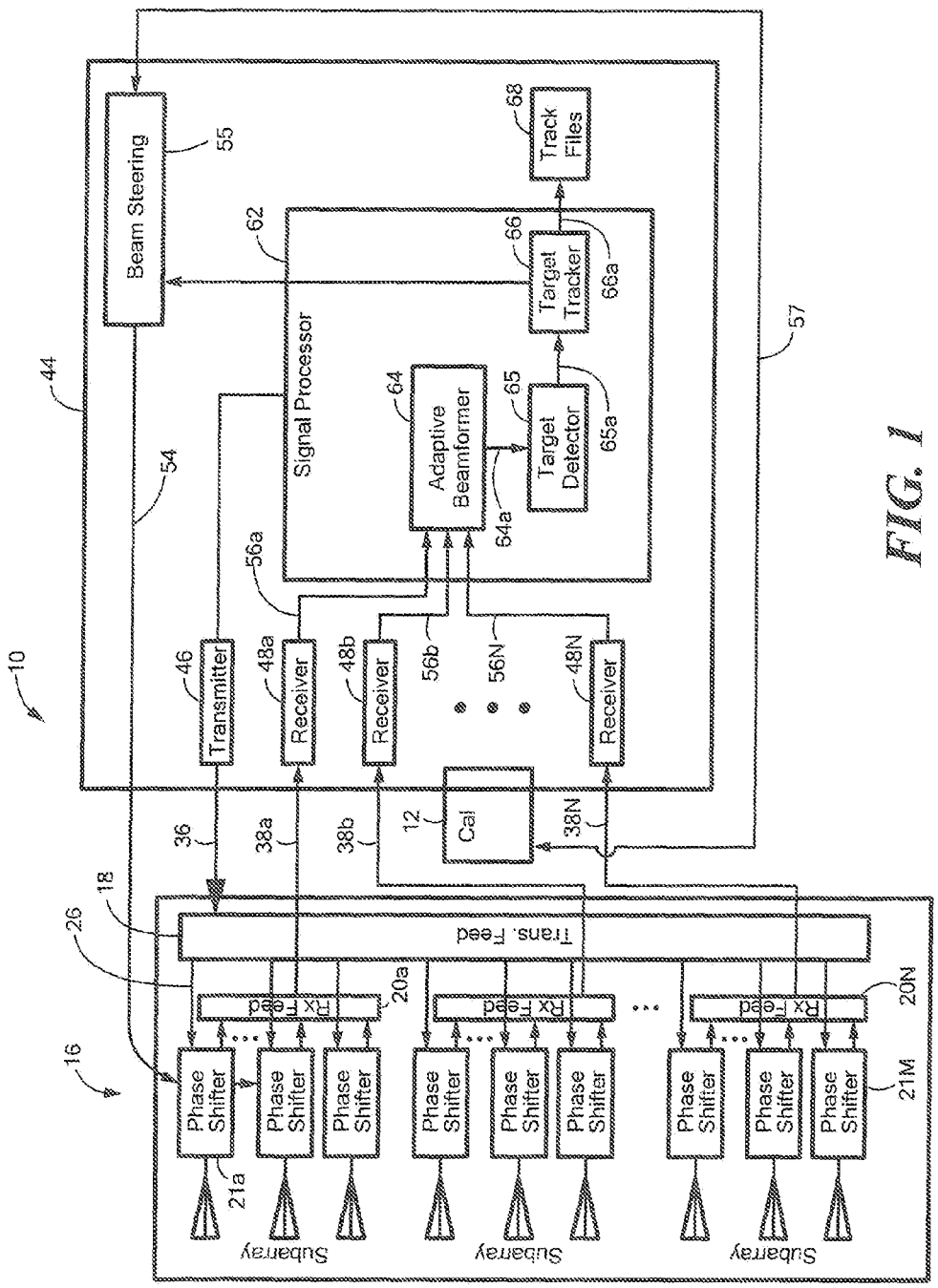
FIG. 1 is a schematic representation of an illustrative phased array radar having calibration in accordance with illustrative embodiments of the invention.

FIG. 1 shows a radar system 10, shown as a phased array radar, having a calibration system 12 in accordance with illustrative embodiments of the invention. In one particular embodiment, each of receive combiner circuits 20a-20N is a separate circuit board. Each of the receive combiner (Rx feed) circuits 20a-20N can be the same or they can be different, depending upon the form of the subarray to which they are coupled. The antenna array also transmits signals 26 provided to selected ones of the array elements via a transmit divider circuit 18. In general, the transmit divider circuit 18 is different from the receive combiner circuits 20a-20N in that the transmit circuit 18 operates in conjunction with one selected set of array elements symmetrically disposed about the antenna array 16, for example, all of the array elements, while each of the receive combiner circuits 20a-20N operates in conjunction with a different subarray having array elements.

The beamformed subarray output signals 38a-38N are coupled to receivers to amplify and downconvert the beamformed subarray output signals 38a-38N to lower frequency received signals 56a-56N. A signal processor 62 includes a beamformer circuit 64 that digitizes the lower frequency received signals 56a-56N and performs beamforming. The beamforming applies complex adaptive weighting factors to the received signals 56a-56N and combines them to generate receive beam signals 64a. Exemplary implementations use low-cost analog (hard wired) beam former. In other embodiments, digital beam forming is contemplated.

The signal processor 62 also includes a target detector 65 to detect targets and to compute target locations using the adaptive receive beam signals 64 and provide target detection data 65a to a target tracker 66, which provides track update information 66a to track files 68. The track files 68 are provided to a radar system operator. The target tracker 65 can also provide a transmit signal direction 54 to a beam steering unit 55. The signal processor 62 also provides a transmit signal waveform to a transmitter 46. An amplified signal 36 is provided to the transmit combiner (trans. Feed) circuit 18. Based on the signal direction from the target tracker 66 and the corrected calibration data from the calibration module 12, the beam steering unit 55 calculates the phase shifter or T/R module settings and sends the digital control signals 54 to phase shifter modules (or T/R modules) 21a-21M in the phased array 16.

It is understood that a wide range of component and processing components, radar configurations and processing techniques known to one of ordinary skill in the art can be used in alternative embodiments. While illustrative embodiments of the invention are shown and described in conjunction with calibration of a radar system, and in particular a phased array radar, it is understood that embodiments of the invention are applicable to systems in general in which calibration is desirable. For example, embodiments of the invention are applicable to large receive phased arrays used on communication satellites to compensate for solar loading effect which causes large temperature changes.

Figure 2A:
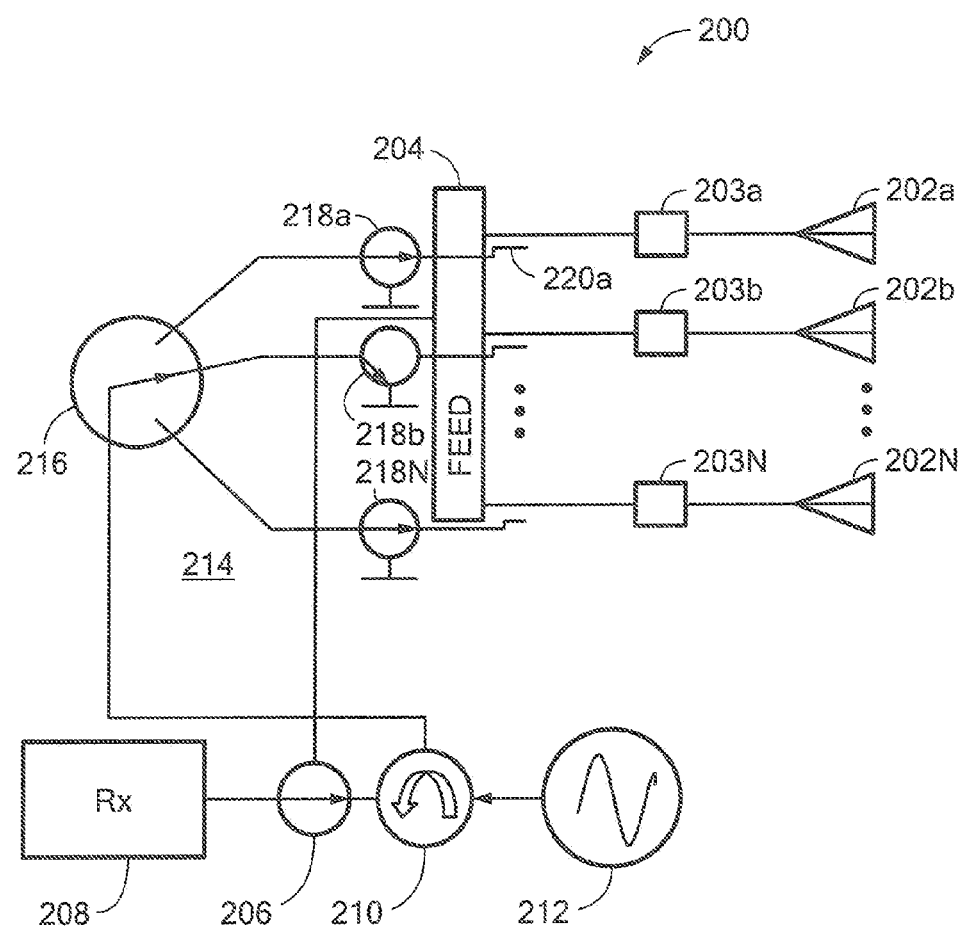
FIG. 2A is a schematic representation of a system in a first calibration configuration.

FIG. 2A shows a system 200 having calibration functionality in accordance with illustrative embodiments of the invention. A series of array elements 202a-N are coupled to a feed 204 via phase shifter or T/R modules 203a-N in a manner well known in the art. The feed 204 is coupled to a receiver switch 206, which is coupled between a receiver 208 and a circulator 210. An exciter 212 is also coupled to the circulator 210.

A calibration system 214 is coupled to the feed to provide calibration functionality. FIG. 2A shows the calibration system in a cable check configuration. The calibration system 214 includes a multiport switch 216 coupled between the circulator 210 and respective feed switches 218a-N, each of which is coupled to the feed 204 and a respective array element 202a-N via a respective coupler 220a-N. The multiport switch 216 has selectable positions to provide connections between the circulator 210 and one of the feed switches 218. The feed switches 218 include selectable positions that provide a path to the array elements 202 via the respective couplers 220, as well as a path to ground.

Figure 2B:
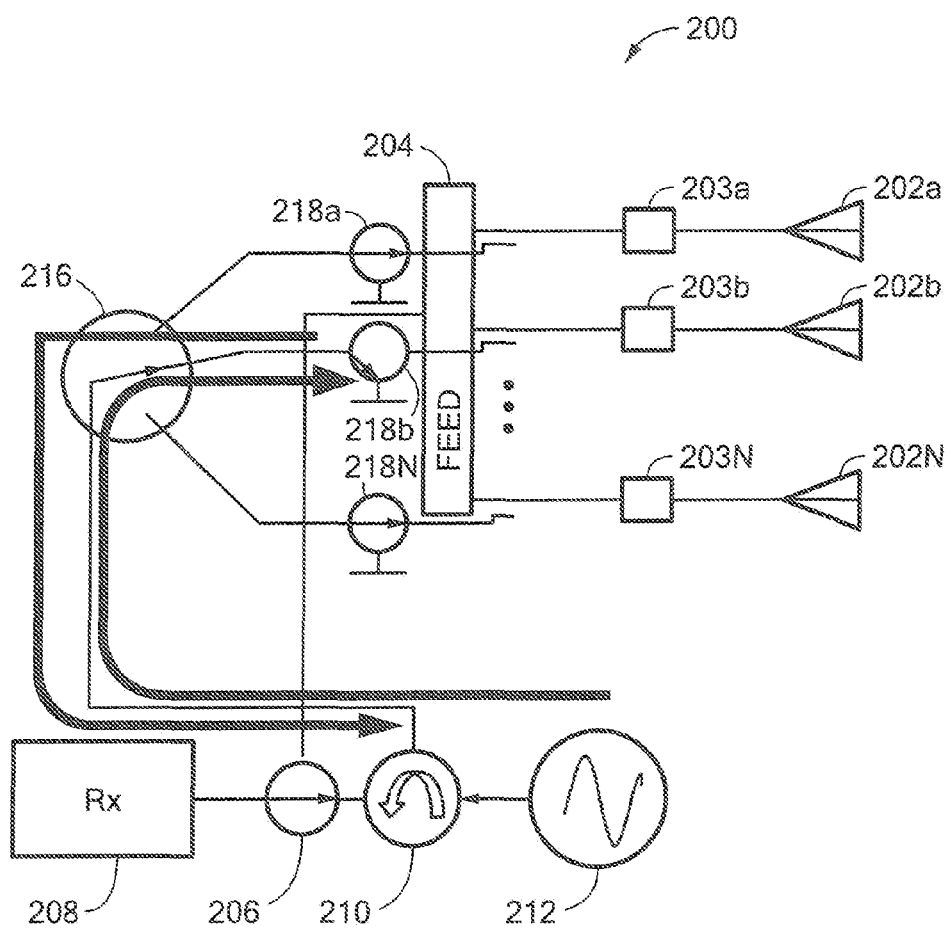
FIG. 2B is a schematic representation of the system of FIG. 2A shown with signal flow paths.

As shown in FIG. 2B, which shows signal flows in the cable check configuration, the exciter 212 provides input signals to the circulator 210 that travel through the multiport switch 216 to a selected one of the feed switches 218, shown as feed switch 218b, which is set to provide a connection to ground. The signal reflects back from ground through the feed switch 218b, multiport switch 216, circulator 210, and receiver switch 206 to the receiver 208. Based on the signal transmitted by the exciter 212 and received at the receiver 208, the characteristics of the signal injection path, which can be referred to as a test cable and test setup, can be determined.

After signal injection paths are characterized by the RF phase and amplitude measurements, one of the signal paths is selected as the reference signal path and the relative amplitude and phase of the other signal paths are calculated by subtracting the phase and amplitude in dB of the reference signal path from the measured data. Thus, the amplitude and phase of the common path components including the circulator are removed from the relative amplitude and phase data. Since the signal travels twice through the cables and the components not in the common path, the signal path correction data for temperature variation or cable movement are about half of the relative amplitude and phase measurements.

The relative phase and loss of signal injection paths are derived from the real-time measurements and used for the calibration test step, which is described below.

Figure 2C:
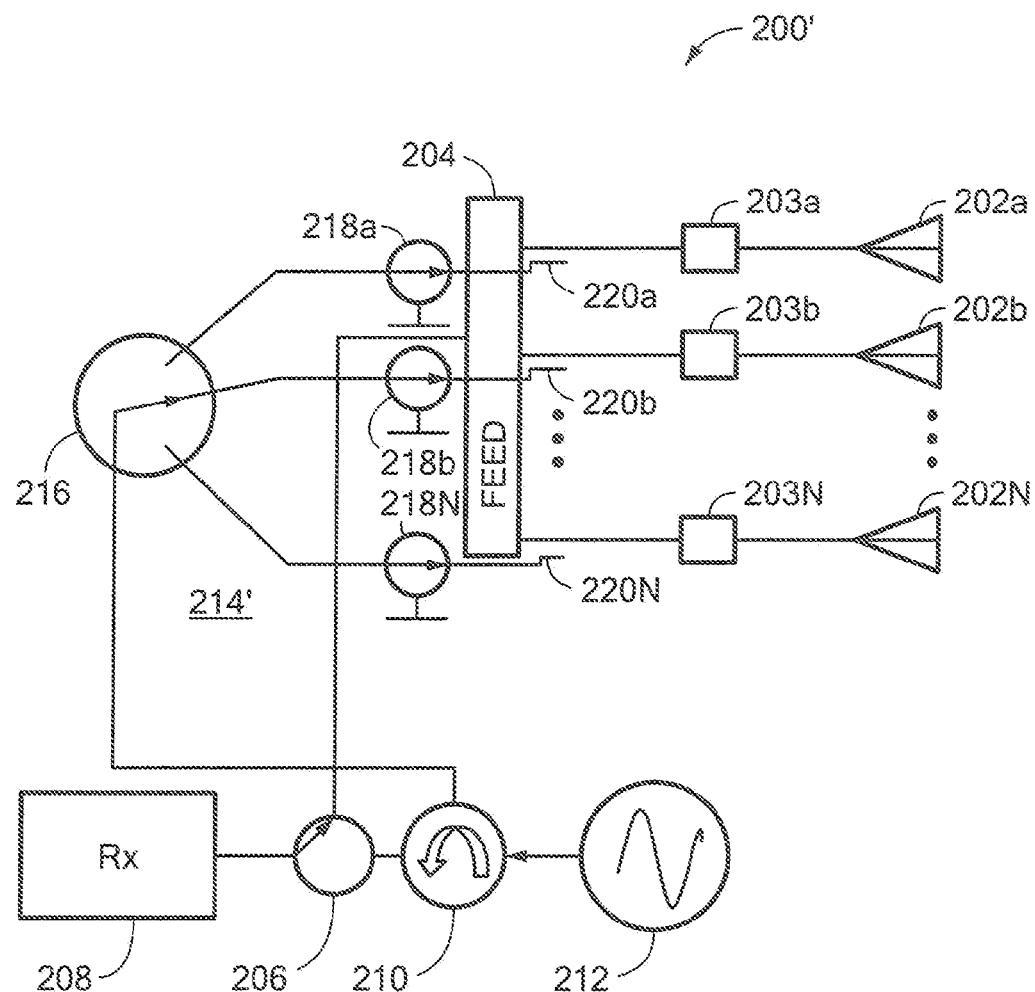
FIG. 2C is a schematic representation of a system in a second calibration configuration.

FIG. 2C shows the system 200' in a calibration test configuration in which switch settings are changed to provide paths for calibration test. The receiver switch 206 now provides a path from the feed 204 to the receiver 208. In addition, instead of a short, the feed switch 218b now provides a path from the multiport switch 216 to the coupler 220b for the respective array element 202b.

Figure 2D:
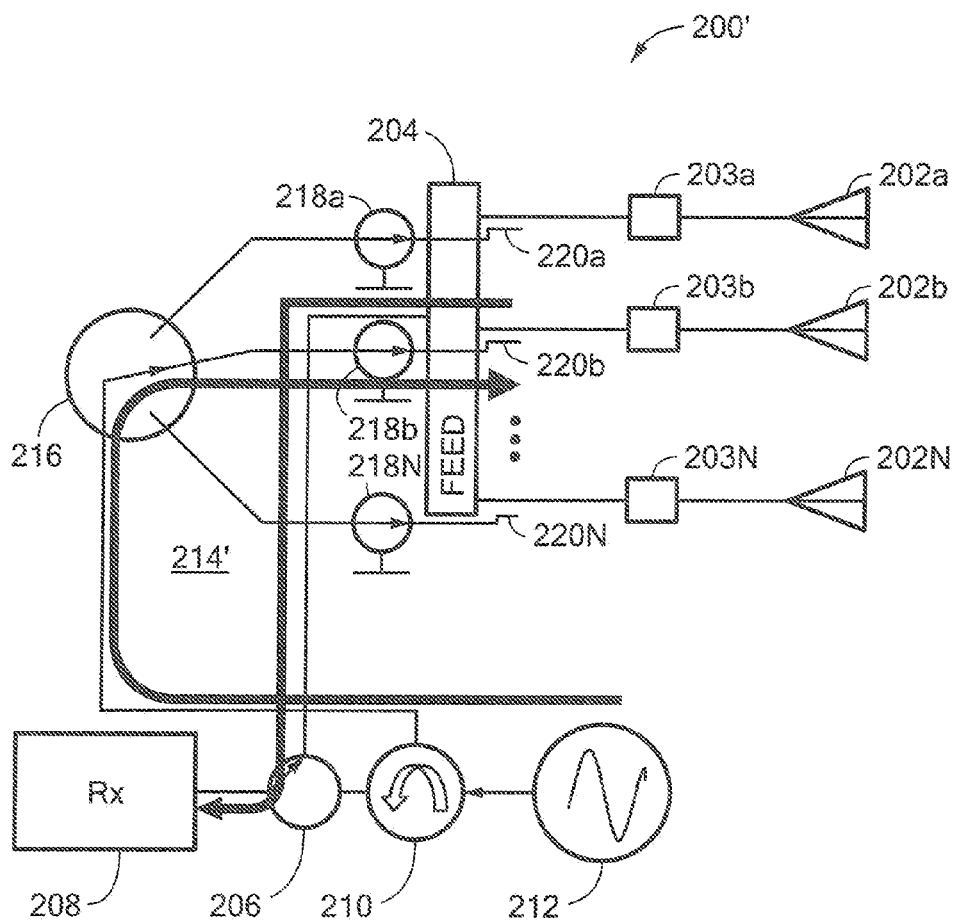
FIG. 2D is a schematic representation of the system of FIG. 2C shown with signal flow paths.

As shown in FIG. 2D, a signal from the exciter 212 is routed through the circulator 210, multiport switch 216, feed switch 218b, and coupler 220b for coupling the signal to the array element 202b. From the array element 202, the signal goes though the feed 204, receiver switch 206, and receiver 208. The signal at the receiver 208, or other measurement device in the signal path, can determine characteristics of the calibration signal measurements for N elements, such as phase and amplitude. The injection signal path correction data are used to remove the path-to-path amplitude and phase variations of the calibration signal injection setup so that the calibration results can be corrected during the calibration test step.

Since the signal paths from the exciter to the array elements, and back to the receiver now have known characteristics, such as phase and amplitude, variation due to temperature, mechanical stress, etc., the signal paths can be effectively removed during system calibration. For example, the cable check and calibration test configurations can be used to characterize signal paths right before illuminating the array with a known signal. By subtracting the known signal injection path characteristics, the array can be calibrated in a straightforward manner.

The corrected calibration data are then used to align the signal vectors from each path by adjusting the phase and amplitude of the phase shifter module or the Transmit/Receive (T/R) module of each individual element of the phased array during in-field system calibration.

With this configuration, the system can make real-time test setup cable measurements right before phased array radar calibration test. The RF shorts at the cable end reflects the RF test signal back to the measurement system of the radar and enables the instantaneous preview of the test setup RF phase and amplitude characteristics. Since variations in the test setup over temperature and stress can be taken out in real time, the calibration test accuracy can be ensured. This is in contrast to prior art systems having long closed loop cables, strict temperature control, or expensive special phase stable RF cables.

Figure 3A:
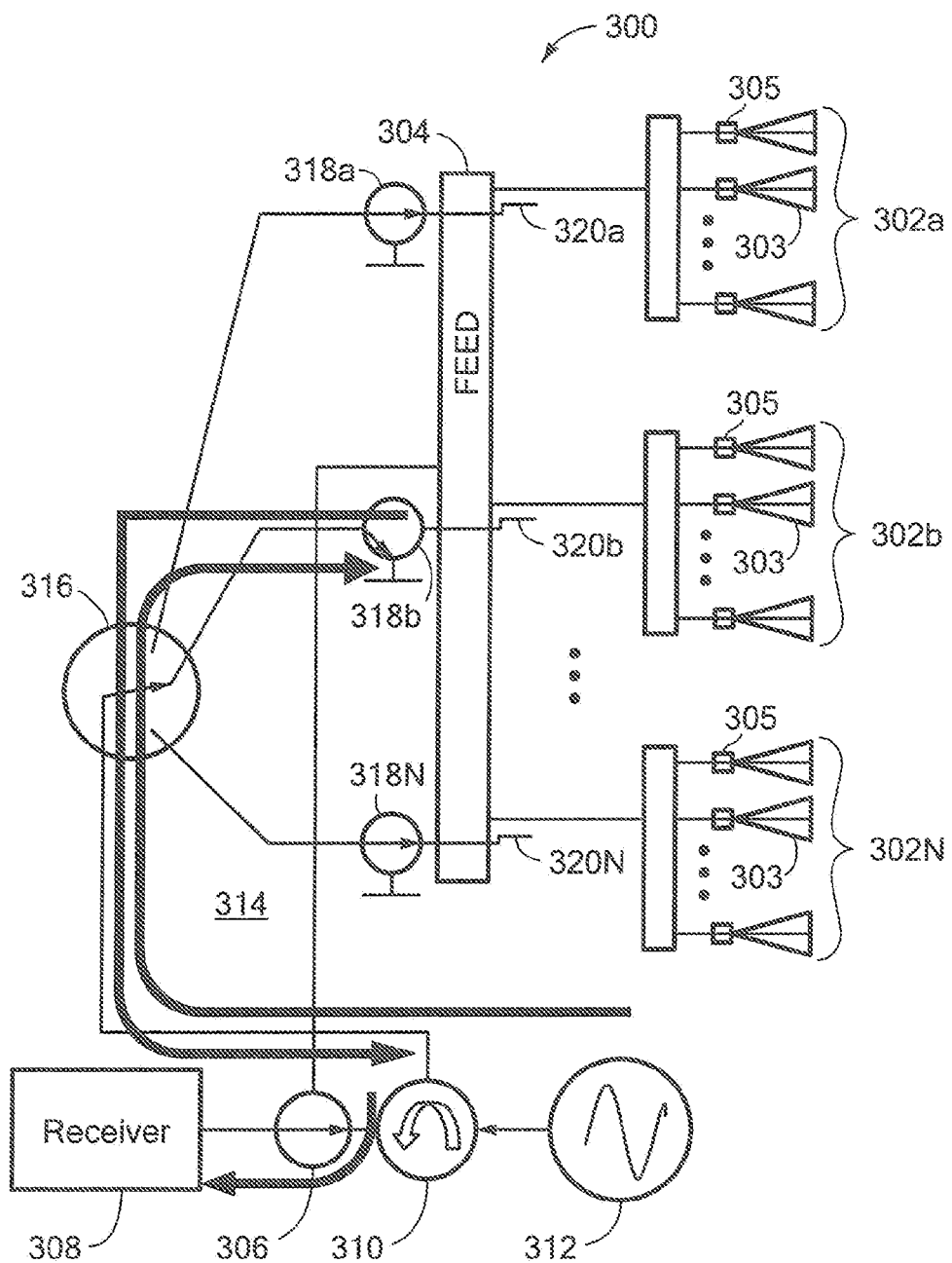
FIG. 3A is a schematic representation of a system having subarrays in a first calibration configuration shown with signal flow paths.

FIG. 3A shows a system 300, which is shown in a cable check configuration, having some similarity with the system of FIG. 2A. The system 300 includes a series of subarrays 302a-N, each of which includes a number of individual array elements 303 and associated phase shifter/T-R modules 305. The subarrays 302 are coupled to a feed 304, which is coupled to a receiver switch 306. The receiver switch 306 is coupled between a receiver 308 and a circulator 310. An exciter 312 is also coupled to the circulator 310. A calibration system 314 provides calibration functionality.

The calibration system 314 includes a multiport switch 316 coupled between the circulator 310 and respective feed switches 318a-N, each of which is coupled to the feed 304 and a respective subarray 302 via a respective coupler 320a-N. The multiport switch 316 has selectable positions to provide connections between the circulator 310 and one of the feed switches 318 coupled to subarrays 303 via the respective couplers 320a-N.

Figure 3B:
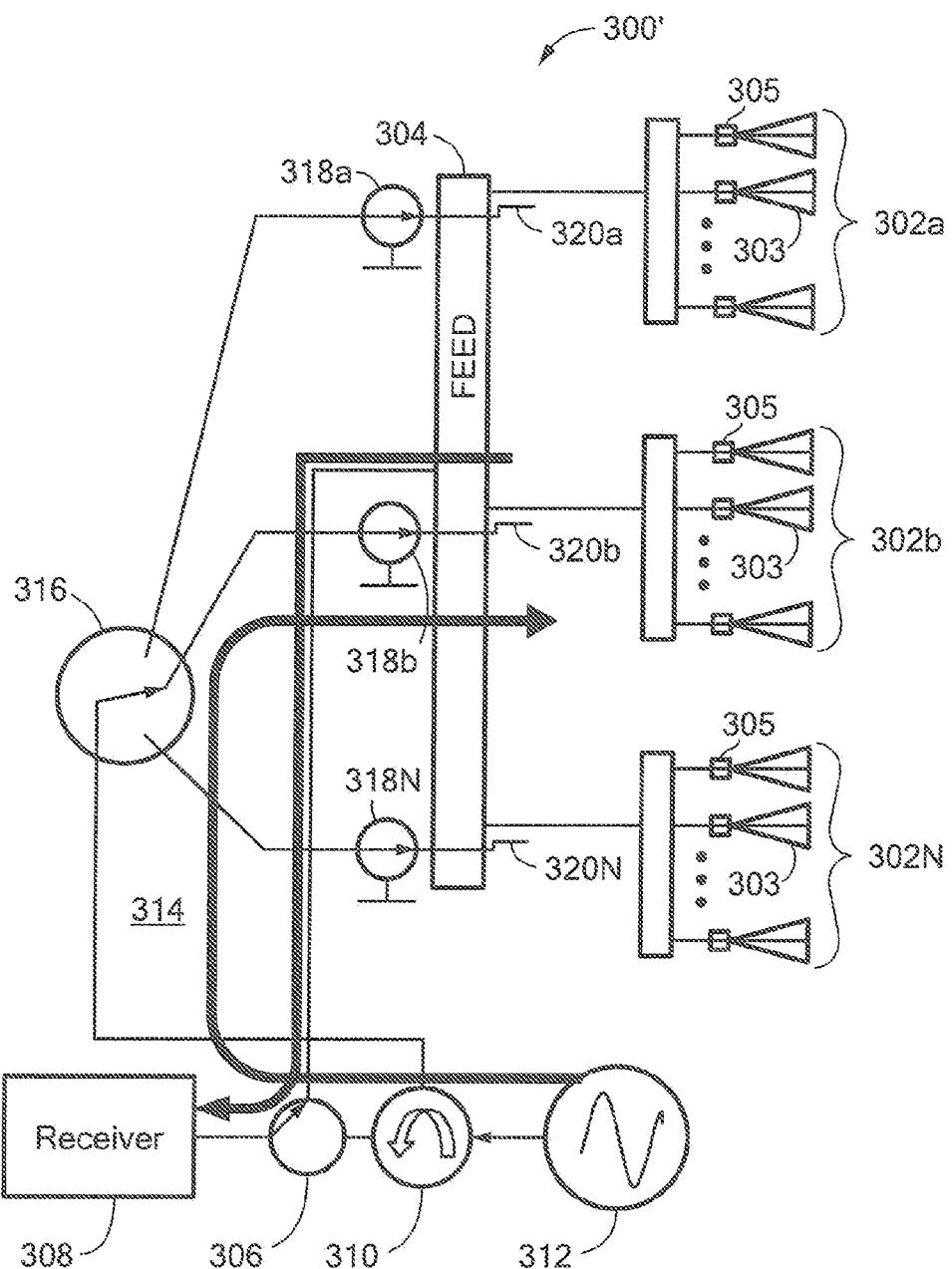
FIG. 3B is a schematic representation of a system having subarrays in a second calibration configuration shown with signal flow paths.

FIG. 3B shows the system 300 in a calibration test configuration in which switch settings are changed to provide paths for calibration test. The receiver switch 306 now provides a path from the feed 304 to the receiver 308 and the feed switch 318b now provides a path from the multiport switch 316 to the coupler 320b for the respective subarray 302b.

The system 300 signal paths can be calibrated using the calibration system 314 in a manner similar to that described above. As will be readily appreciated, the subarrays 302 enable a larger aperture to be calibrated.

Figure 4A:
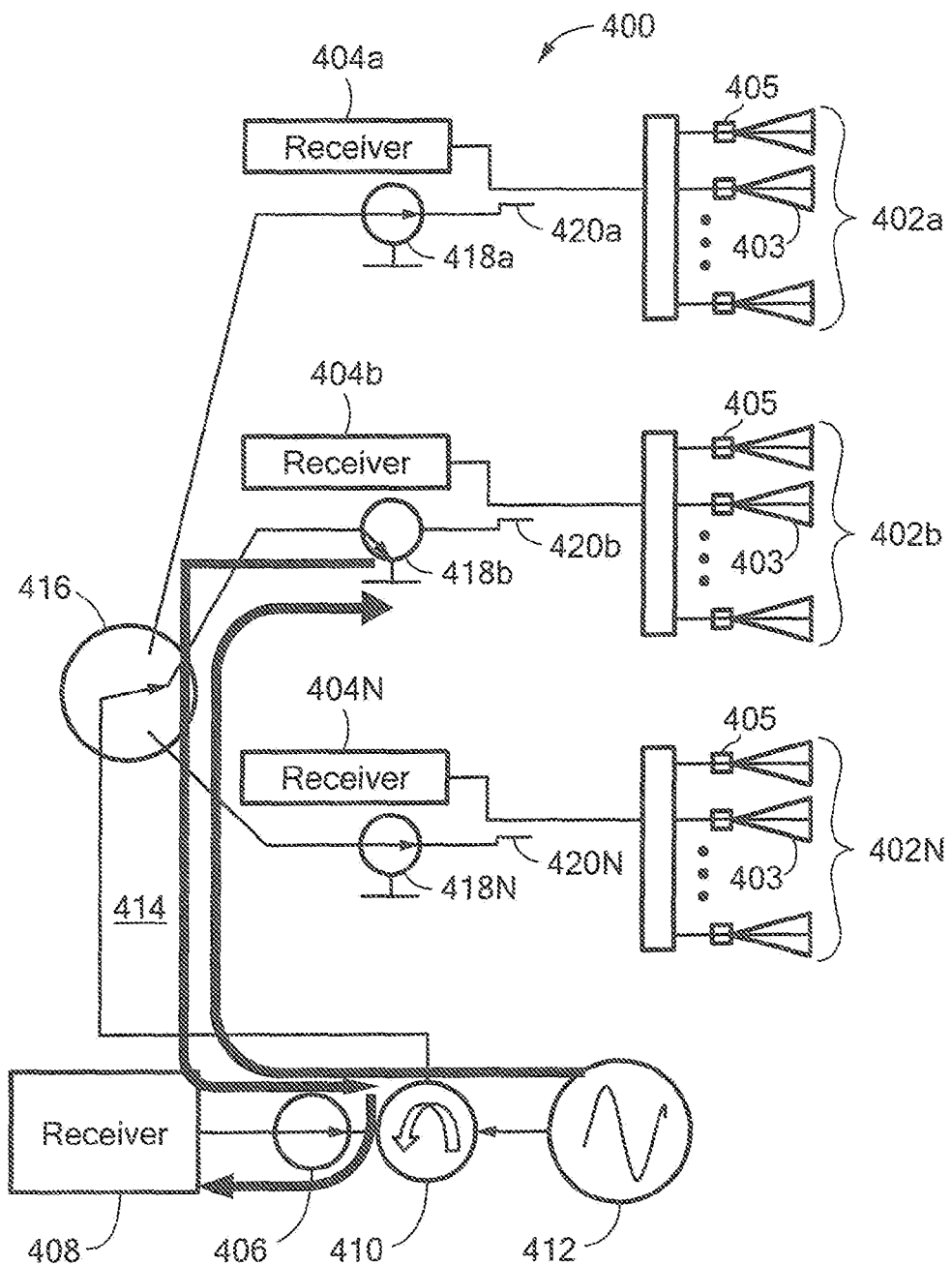
FIG. 4A is a schematic representation of a system having digital beamforming in a first calibration configuration shown with signal flow paths.
Figure 4B:
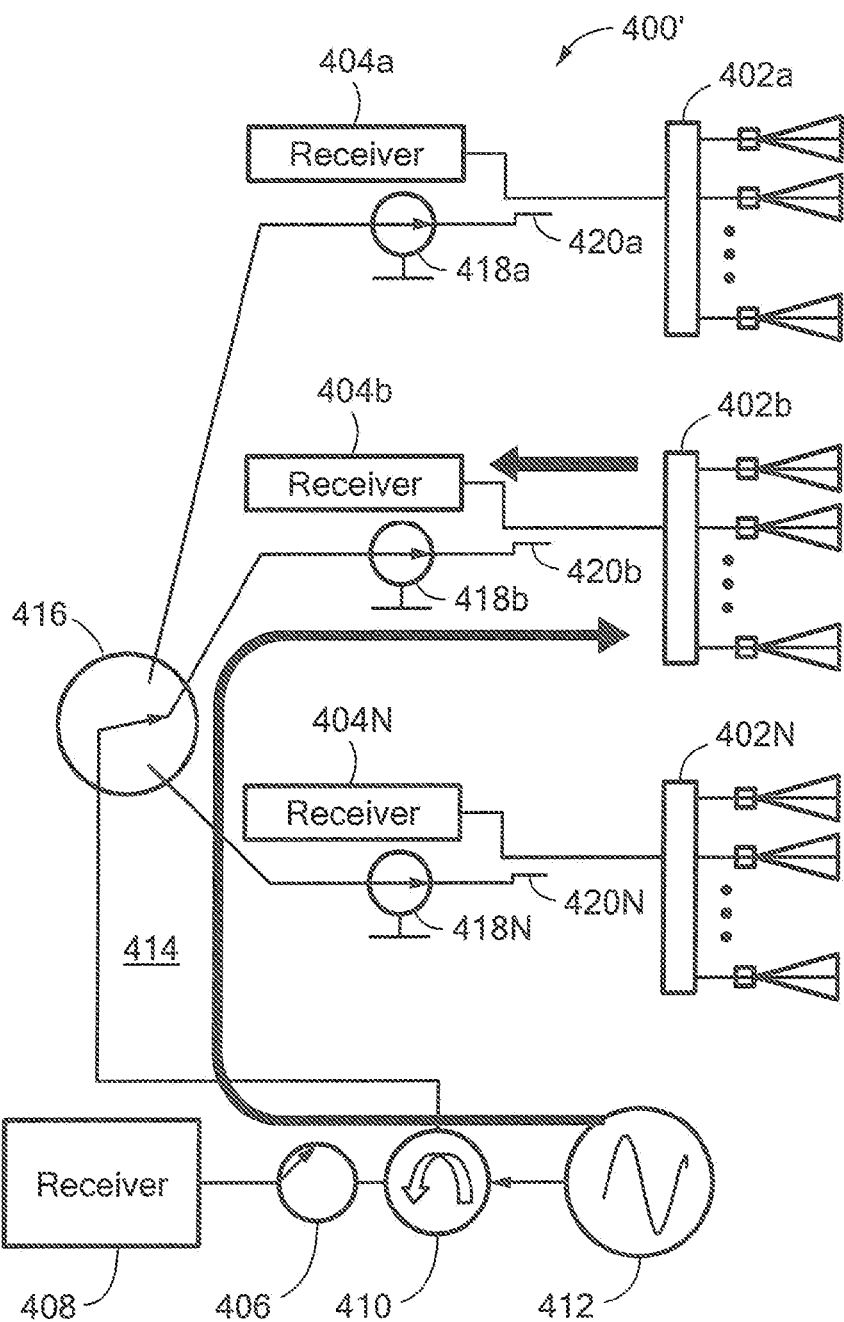
FIG. 4B is a schematic representation of a system having digital beamforming in a second calibration configuration shown with signal flow paths.

FIG. 4A shows a system 400 having digital beamforming in a cable check configuration and FIG. 4B shows the system 400' in a calibration test configuration. The system 400 includes a series of receivers 404a-N coupled to respective subarrays 402a-N having array elements 403 and associated phase shifter/T-R modules 405. The calibration system 414, which is similar to the calibration systems of FIGS. 2A and 3A, includes couplers 420a-N for the respective subarrays 402a-N. The signal paths can be can be calibrated as described above.

For phased array radar systems using digital beamforming, as shown in FIGS. 4A and 4B, the corrected calibration data can be sent directly to the digital beamforming processing module in the signal processor to digitally correct the received signal waveform and no phase shifter or T/R module adjustments are needed.

Embodiments of the invention enable measurement of the propagation phase and loss of signal paths and cables in a calibration system in real time. This allows the removal of phase and amplitude variations over temperature and stress to enable accurate system calibration. With this arrangement, a system can calibrate unequal cable lengths used in a digital beamformer system with multiple receivers, for example. By eliminating long closed loop cables used in conventional systems, the hardware and maintenance costs of an inventive radar calibration system can be significantly reduced. In addition, the system can calibrate out cable phase and amplitude variations in a thermal chamber test setup for radar system thermal cycling tests.

This is in contrast to conventional systems that attempt to remove variations over temperature and stress by coupling calibration signals to array elements through opposite ends of a closed signal injection loop and then adding both outputs to cancel the variations. For a sparsely populated antenna system, such as interferometer radar and UHF early warning radar systems, the closed signal injection loop can be quite long and relatively difficult to maintain with sufficient accuracy due to high cable loss and large propagation phase.

Figure 5:
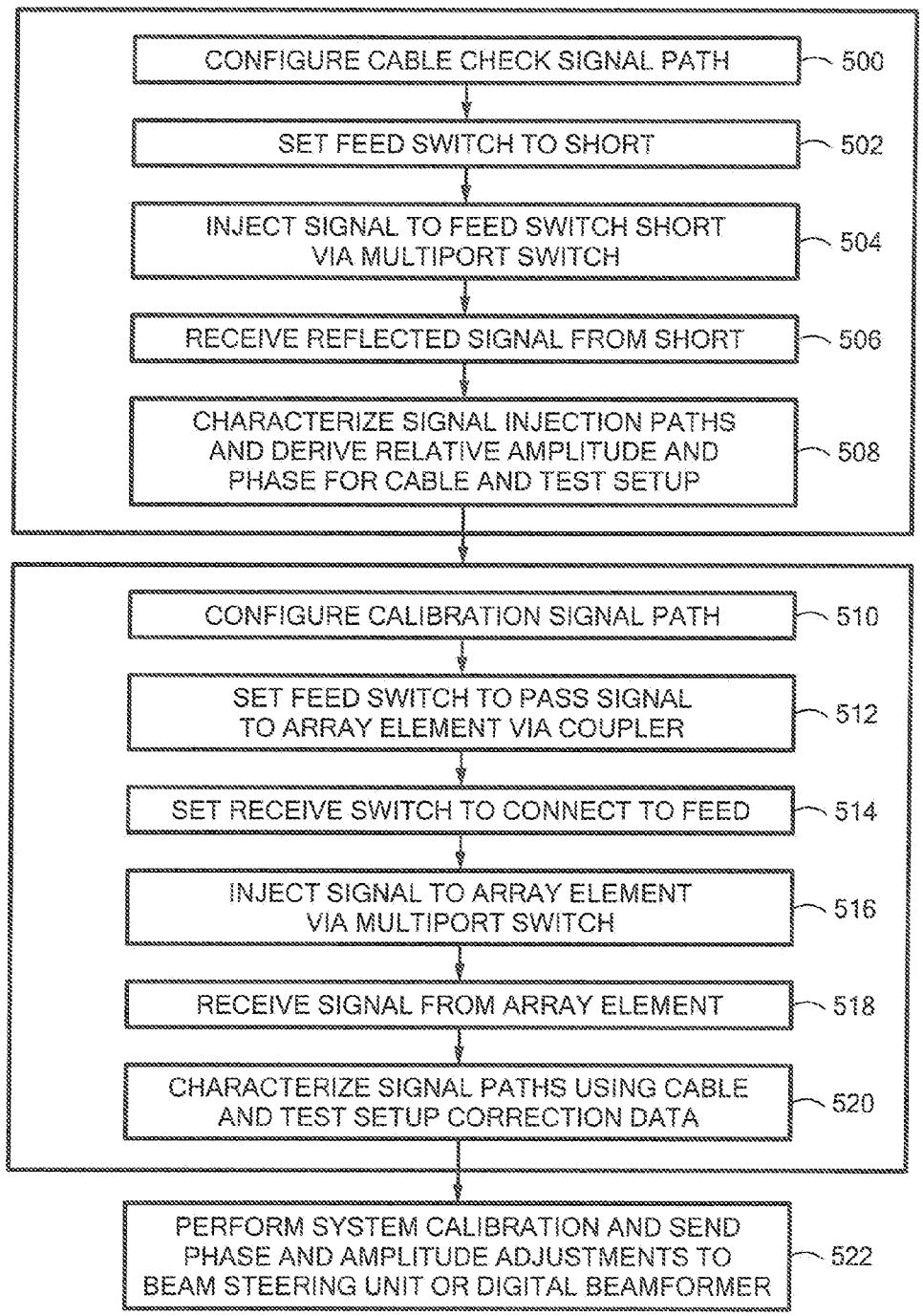
FIG. 5 is a flow diagram showing an illustrative sequence of steps for calibration.

FIG. 5 shows an exemplary sequence of steps for calibrating a radar system in accordance with illustrative embodiments of the invention. In step 500, signal paths are configured in a cable check arrangement. In step 502, a feed switch is set to provide a short to ground. In step 504, a signal is injected into the feed switch ground via a multi-port switch, and reflected from the short to ground. The reflected signal is received by a receiver or other measurement system in step 506. Based on the injected and received signal, the signal paths to and from the short to ground can be characterized in phase and loss for example, in step 508.

In step 510, signal paths are configured for calibration signal path. In step 512, the feed switch is set to pass a signal to an array element via a coupler and in step 514, a receive switch is set to provide a connection from the feed to a receiver or other measurement system. In step 516, a signal is injected via the multiport switch and feed switch to the array element or subarray feed. In step 518, the signal coupled back from the array element or subarray feed is propagated through the feed to the receive switch. The signal from the array element or subarray feed can be measured and the signal paths characterized in step 520. In step 522, the system can be calibrated using the known characteristics of the signal injection test setup paths, which can be readily removed.

Figure 6:
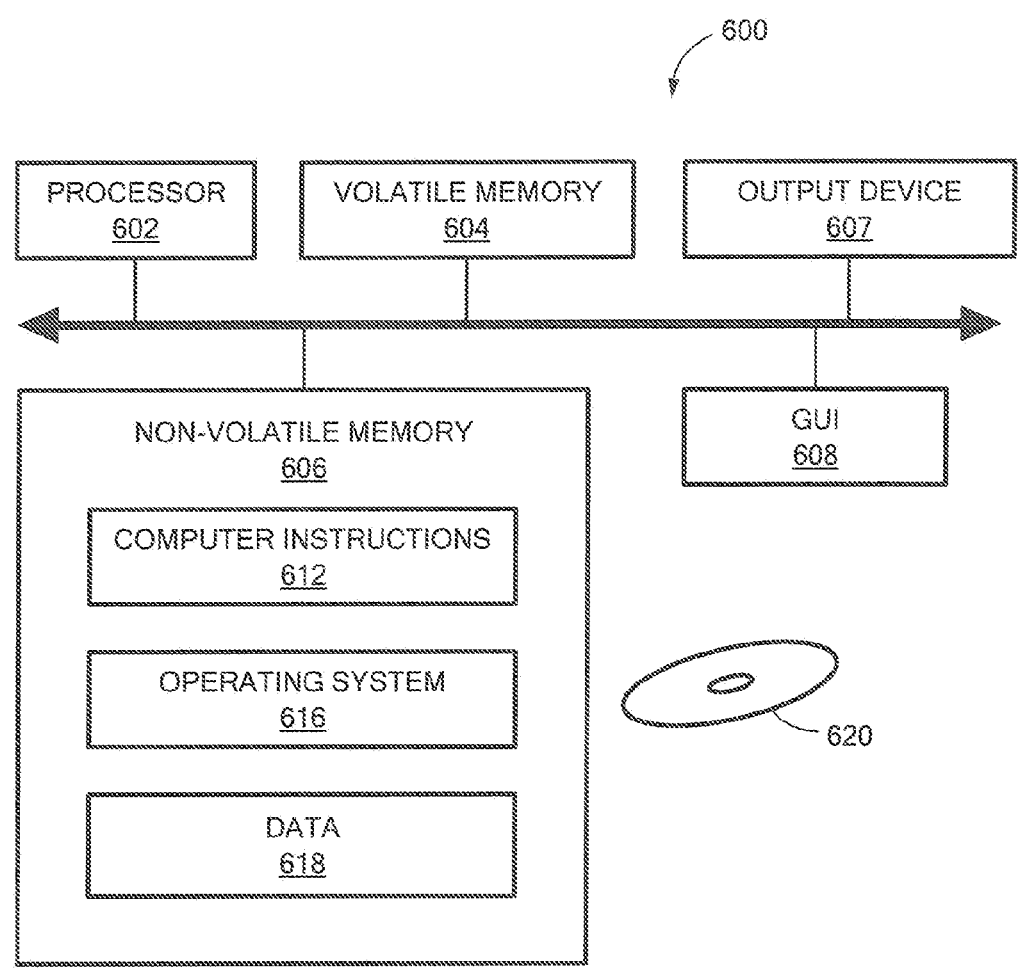
FIG. 6 is a schematic representation of an illustrative computer that can perform at least a portion of the processing described herein.

FIG. 6 shows an exemplary computer 600 that can perform at least part of the processing described herein. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a computer-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a computer-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
injecting a first signal through a first signal path including a first element, a first cable, a multiport switch, a second cable, and a feed switch;
setting the feed switch to have a connection to ground prior to injecting the first signal;
receiving the first signal reflected from ground through the feed switch, the second cable, the multiport switch, the first cable, the first element, and a receive switch for reception by a receiver;
measuring characteristics of the first signal received by the receiver;
characterizing the first signal path from the first signal that is received;
modifying settings on the feed switch and the receive switch;
injecting a second signal through the first element, the first cable, the multiport switch, the second cable, and the feed switch into a feed coupled to an array element via a coupler;
receiving the second signal from the array element through a second signal path including the feed and the receiver switch;
characterizing the second signal path based on the received second signal;
subtracting at least some of the characteristics of the first path from calibration signals injected into the array element; and
deriving phase and amplitude correction constants from the calibration signal measurements.

2. The method according to claim 1, further including sending information for the phase and amplitude correction constants to phase shifters and/or transmit/receive modules via a beam steering module.

3. The method according to claim 1, wherein at least some of the characteristics comprise substantially half of the relative phase and loss of the calibration paths.

4. The method according to claim 1, wherein the characteristics include phase and amplitude.

5. The method according to claim 1, wherein the array elements form part of a phased array radar.

6. The method according to claim 1, wherein calibration is independent of the length of the first and second cables.

7. The method according to claim 1, wherein the first element comprises a circulator.

8. The method according to claim 1, wherein the receiver performs digital beamforming.

9. The method according to claim 1, further including performing in-field calibration for a deployed phased array radar system.

10. The method according to claim 1, further including performing calibration immediately after the step of deriving phase and amplitude correction constants from the calibration signal measurements.

11. An article, comprising:
a non-transitory computer-readable storage medium containing stored instructions that enable a computer to:
subtract at least some of the characteristics of a first path from calibration signals injected into an array element; and
derive phase and amplitude correction constants from the calibration signal measurements,
after:
injecting a first signal through the first signal path including a first element, a first cable, a multiport switch, a second cable, and a feed switch;
setting the feed switch to have a connection to ground prior to injecting the first signal;
receiving the first signal reflected from ground through the feed switch, the second cable, the multiport switch, the first cable, the first element, and a receive switch for reception by a receiver;
measuring characteristics of the first signal received by the receiver;
characterizing the first signal path from the first signal that is received;
modifying settings on the feed switch and the receive switch;
injecting a second signal through the first element, the first cable, the multiport switch, the second cable, and the feed switch into a feed coupled to an array element via a coupler;
receiving the second signal from the array element through a second signal path including the feed and the receiver switch; and
characterizing the second signal path based on the received second signal.

12. The article according to claim 11, further including instructions for sending information for the phase and amplitude correction constants to phase shifters and/or transmit/receive modules via a beam steering module.

13. The article according to claim 11, wherein at least some of the characteristics comprise substantially half of the relative phase and loss of the calibration paths.

14. The article according to claim 11, wherein the characteristics include phase and amplitude.

15. The article according to claim 11, wherein the array elements form part of a phased array radar.

16. The article according to claim 11, wherein calibration is independent of the length of the first and second cables.

17. The article according to claim 11, wherein the first element comprises a circulator.

18. The article according to claim 11, wherein the receiver performs digital beamforming.

19. The article according to claim 11, further including performing in-field calibration for a deployed phased array radar system.

20. A radar system, comprising:
a calibration system including a multiport switch, a RF switch, and a feed switch; and
a feed coupled to array elements;
a processor coupled to a memory, the processor and memory configured to:
inject a first signal through a first signal path including a first element, a first cable, the multiport switch, a second cable, and the feed switch;

set the feed switch to have a connection to ground prior to injecting the first signal;
receive the first signal reflected from ground through the feed switch, the second cable, the multiport switch, the first cable, the first element, and a receive switch for reception by a receiver;
measure characteristics of the first signal received by the receiver;
characterize the first signal path from the first signal that is received;
modify settings on the feed switch and the receive switch;
inject a second signal through the first element, the first cable, the multiport switch, the second cable, and the feed switch into a feed coupled to an array element via a coupler;
receive the second signal from the array element through a second signal path including the feed and the receiver switch;
characterize the second signal path based on the received second signal; and
subtract at least some of the characteristics of the first path from calibration signals injected into the array element; and
derive phase and amplitude correction constants from the calibration signal measurements.

* * * * *